United States Patent
Parker et al.

(10) Patent No.: US 10,168,994 B2
(45) Date of Patent: Jan. 1, 2019

(54) RANDOM NUMBER GENERATOR INCLUDING ENTROPY SOURCE

(71) Applicant: Intel Corporation, Santa Clara, CA (US)

(72) Inventors: Rachael J. Parker, Forest Grove, OR (US); Calvin Chiem, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 15/484,926

(22) Filed: Apr. 11, 2017

(65) Prior Publication Data

US 2018/0293053 A1    Oct. 11, 2018

(51) Int. Cl.
*G06F 7/58* (2006.01)

(52) U.S. Cl.
CPC .................................. *G06F 7/588* (2013.01)

(58) Field of Classification Search
None
See application file for complete search history.

(56) References Cited

U.S. PATENT DOCUMENTS

| | | |
|---|---|---|
| 6,687,721 B1 | 2/2004 | Wells et al. |
| 6,792,438 B1 * | 9/2004 | Wells ...................... G06F 7/588 708/250 |
| 8,010,587 B2 | 8/2011 | Kumar et al. |
| 8,015,224 B1 * | 9/2011 | Chaichanavong .... H04L 9/0861 708/254 |
| 8,489,660 B2 | 7/2013 | Herbert et al. |
| 9,223,503 B2 | 12/2015 | Khan et al. |
| 9,311,051 B2 * | 4/2016 | Kaplan ................... G06F 7/588 |
| 2005/0203979 A1 * | 9/2005 | Clements ................ G06F 7/588 708/251 |
| 2011/0060935 A1 * | 3/2011 | Regev ..................... G06F 7/588 713/500 |
| 2013/0013657 A1 * | 1/2013 | Emelko ................... G06F 7/588 708/251 |

* cited by examiner

*Primary Examiner* — Michael D. Yaary
(74) *Attorney, Agent, or Firm* — Schwabe, Williamson & Wyatt, P.C.

(57) ABSTRACT

Embodiments include apparatuses, methods, and systems for a random number generator that includes an entropy source. The entropy source may be coupled to a deterministic feedback circuit and a stochastic feedback circuit. The deterministic feedback circuit may include detection logic to detect when a bit of the output signal of the entropy source has registered, a pre-delay feedback path to cause the entropy source to power off responsive to the detection, and a post-delay feedback path to cause the entropy source to power on, after the entropy source is powered off, to generate a second bit of the output signal. The post-delay feedback path may include one or more delay cells that are bypassed by the pre-delay feedback path. Other circuits and techniques related to random number generators are also described. Further embodiments may be described and/or claimed.

25 Claims, 8 Drawing Sheets

RANDOM NUMBER GENERATOR INCLUDING ENTROPY SOURCE

FIELD

Embodiments of the present invention relate generally to the technical field of electronic circuits, and more particularly to random number generator circuits including an entropy source.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many electronic circuits, such as computer chips, use a random generator to generate random numbers for various functions, such as encryption and/or authentication. Some random number generators use an entropy source based on a metastable element to generate a random output value. The metastable element may be embedded in a feedback loop that contains deterministic and stochastic feedback mechanisms. The deterministic feedback forms a relaxation oscillator (e.g., an astable multivibrator) around the metastable element. The stochastic feedback provides a dynamic offset cancellation process.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
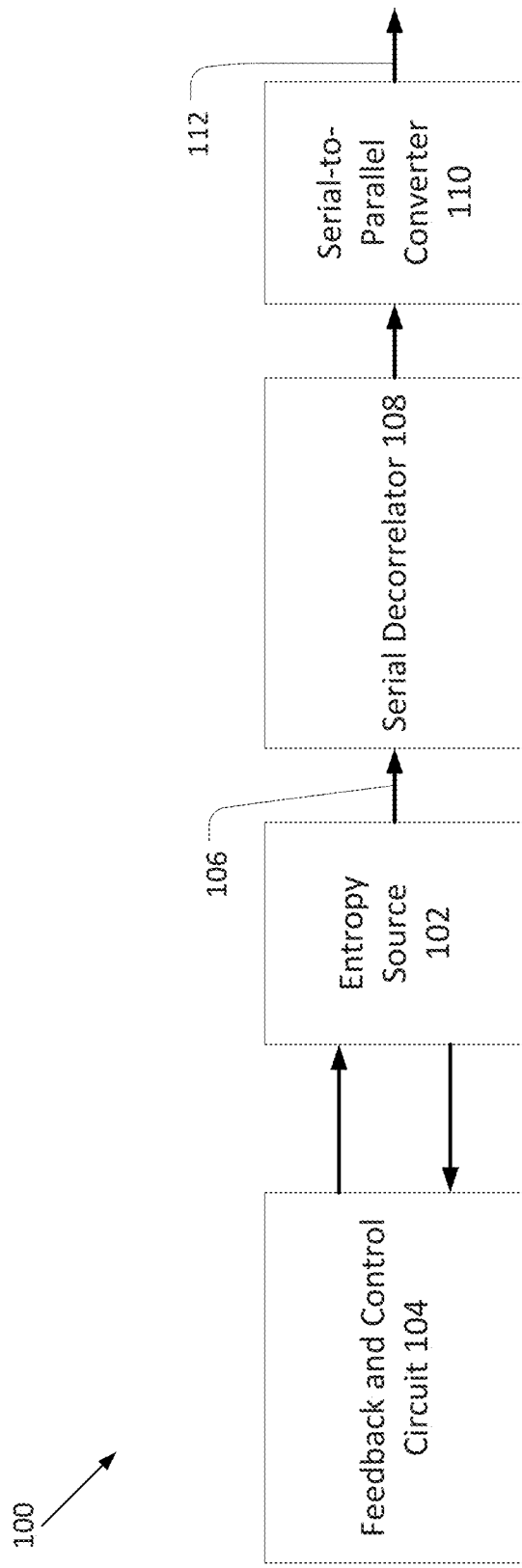
FIG. 1 illustrates a random number generator circuit in accordance with various embodiments.

Embodiments include apparatuses, methods, and systems associated with a random number generator that includes an entropy source. The entropy source may be coupled to a deterministic feedback circuit and a stochastic feedback circuit. The deterministic feedback circuit may include detection logic to detect when a bit of the output signal of the entropy source has registered, a pre-delay feedback path to cause the entropy source to power off responsive to the detection, and a post-delay feedback path to cause the entropy source to power on, after the entropy source is powered off, to generate a subsequent bit of the output signal. The post-delay feedback path may include one or more delay cells that are bypassed by the pre-delay feedback path.

In various embodiments, the detection logic may output a pre-delay feedback signal based on the detection of when a bit of the output signal of the entropy source has registered. For example, the pre-delay feedback signal may change logical value when the logical values of the output signal and an output bar signal are different. The deterministic feedback circuit may further include reset logic to receive the pre-delay feedback signal via the pre-delay feedback path and a post-delay feedback signal via the post-delay feedback path, wherein the reset logic is coupled to the entropy source to power off and power on the entropy source based on the pre-delay signal and the post-delay signal. Additionally, or alternatively, the deterministic feedback circuit may further include a first set-reset (SR) latch having a first input to receive the output signal from the entropy source, a second input to receive the post-delay feedback signal, and an output coupled to a first input of the detection logic, and a second SR latch having a first input to receive the output bar signal from the entropy source, a second input to receive the post-delay feedback signal, and an output coupled to a second input of the detection logic.

The pre-delay feedback path of the deterministic feedback circuit may cause the entropy source to be powered on for less than half of a cycle of the deterministic feedback loop (e.g., for less than 45% of the cycle, such as less than 25% of the cycle). Additionally, the length of time that the entropy source is powered on may be independent of the frequency at which the deterministic feedback loop operates (e.g., based on the length of the cycle). Since the entropy source may consume direct current (DC) current while it is powered on, these improvements may save significant electrical power.

In various embodiments, the stochastic feedback circuit may include a one shot circuit to generate one or more pulse signals based on a value of the output signal of the entropy source (e.g., the first bit). The stochastic feedback circuit may further include a stepper circuit to control one or more stochastic feedback signals (e.g., the adjustment voltage, Vadj, signal described below) provided to the entropy source based on the one or more pulse signals (e.g., using a charge pump). The stochastic feedback signal may control a drive strength of a pair of contentious components (e.g., inverters) of the entropy source. A step size of a change in the drive strength of the pair of contentious components may be based on the pulse width of the pulse signal. In some embodiments, the pulse width of the pulse signal may be adjustable. For example, an adjustable tap may be coupled to the delay line of the deterministic feedback circuit to control the pulse width of the pulse signal.

In some embodiments, the stepper circuit may include a common pull-up node, a common-pull down node and/or one or more common tuning resistors to generate a pair of stochastic feedback signals (e.g., adjustment voltages). These features may enable the stepper circuit to make voltage changes in the stochastic feedback signals of the same magnitude (but opposite polarities) for a same pulse width responsive to a first or second pulse signal. In some embodiments, the stepper circuit may include a charge pump.

In some embodiments, the random number generator circuit may include a serial decorrelator circuit to receive and process the output signal from the entropy source. The serial decorrelator circuit may XOR individual bits of the output signal of the entropy source with a respective prior bit of the output signal that is a first number of bits prior to the individual bit to obtain XORed bits; subsample the XORed bits; and output the subsampled XORed bits to generate a random number. In some embodiments, the subsampled XORed bits may be further processed by a serial-to-parallel converter to generate the random number.

The above description is merely presented as examples of some embodiments of the disclosure, and additional embodiments and variations on the above embodiments are described below.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Additionally, to the extent that specific logical operations or logic gates are described, it will be apparent that other logical operations or logic gates may be substituted to perform a similar function, in some embodiments.

FIG. 1 illustrates a random number generator circuit 100 (hereinafter "circuit 100") in accordance with various embodiments. The circuit 100 may include an entropy source 102 and a feedback and control circuit 104 that form a feedback loop. The feedback and control circuit 104 may provide stochastic feedback and deterministic feedback to the entropy source 102, as further discussed herein. The entropy source 102 may generate an output signal at output terminal 106. In some embodiments, the circuit 100 may further include a serial decorrelator 108 and/or a serial-to-parallel converter 110 to process the output signal of the entropy source 102 to provide an output signal of the circuit 100 (e.g., at output terminal 112). In some embodiments, the serial decorrelator 108 and/or serial-to-parallel converter 110 may not be included in the circuit 100.

Figure 2:
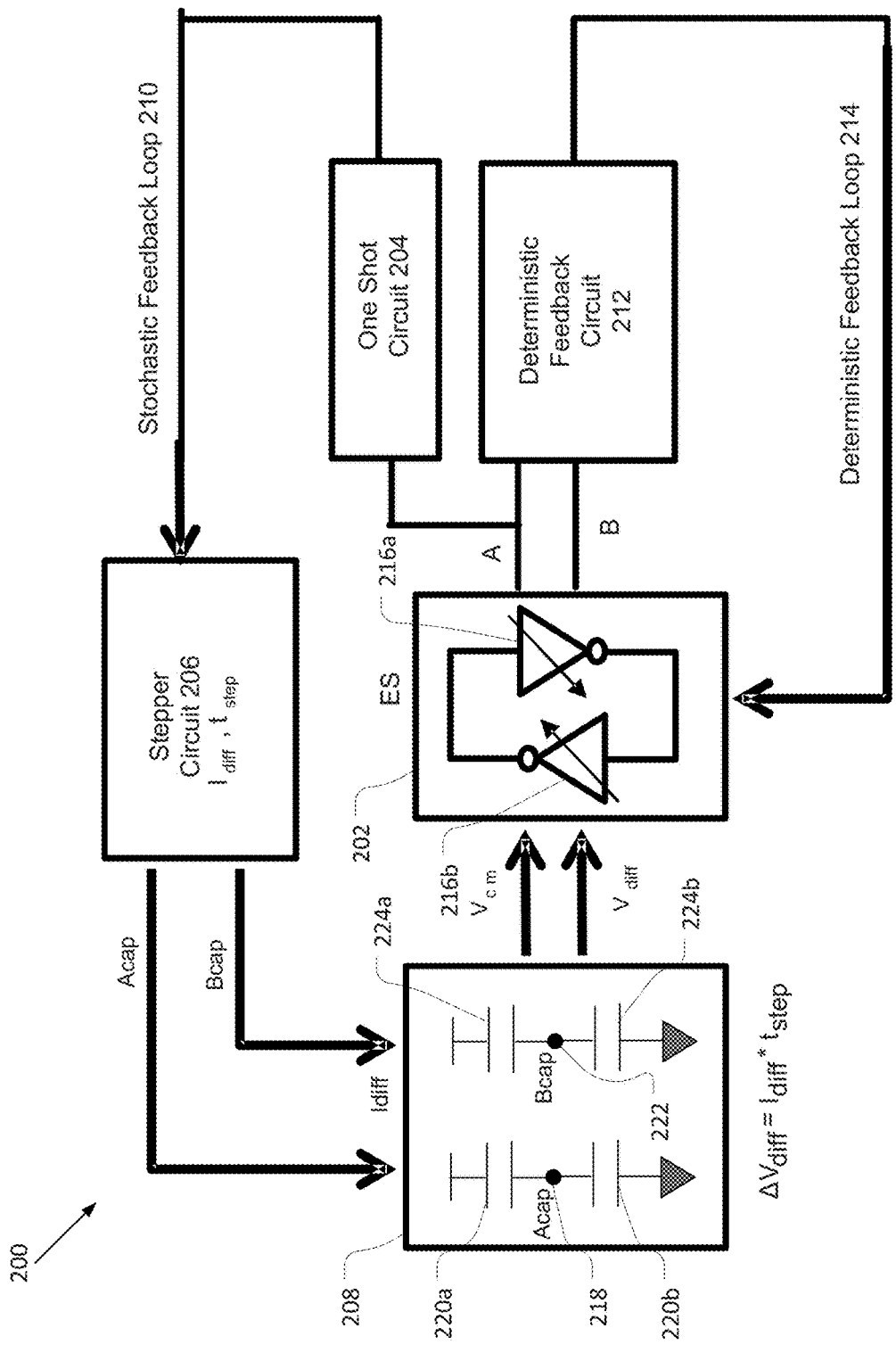
FIG. 2 illustrates an entropy source, a deterministic feedback circuit, and a stochastic feedback circuit in accordance with various embodiments.

FIG. 2 illustrates a circuit 200 including an entropy source 202. The entropy source 202 may correspond to the entropy source 102 of circuit 100. The circuit 200 may further include a one shot circuit 204, a stepper circuit 206, and/or capacitors 220a-b and 224a-b on a stochastic feedback loop 210 for the entropy source 202. Additionally, the circuit 200 may include a deterministic feedback circuit 212 to provide a deterministic feedback loop 214 for the entropy source 202. The one shot circuit 204, stepper circuit 206, capacitors 220a-b and 224a-b, and/or deterministic feedback circuit 212 may be included in the feedback and control circuit 104 of circuit 100. In some embodiments, the capacitors 220a-b and 224a-b may be considered part of the stepper circuit 206.

In various embodiments, the entropy source 202 may generate an output signal A and an output bar signal B. The output bar signal B may be an inverse of the output signal A (e.g., B may be logic 1 when A is logic 0 and B may be logic 0 when A is logic 1) when the entropy source 202 is powered on and the output signal A registers. The entropy source 202 is shown as a pair of cross-coupled inverters 216a-b. The entropy source 202 may include a different design in other embodiments, and the embodiments and techniques described herein may be used with any suitable design of entropy source. The output signals A and B may assert when there is sufficient difference (e.g., greater than a transistor threshold voltage) between the outputs of the two inverters 216a-b.

Figure 3:
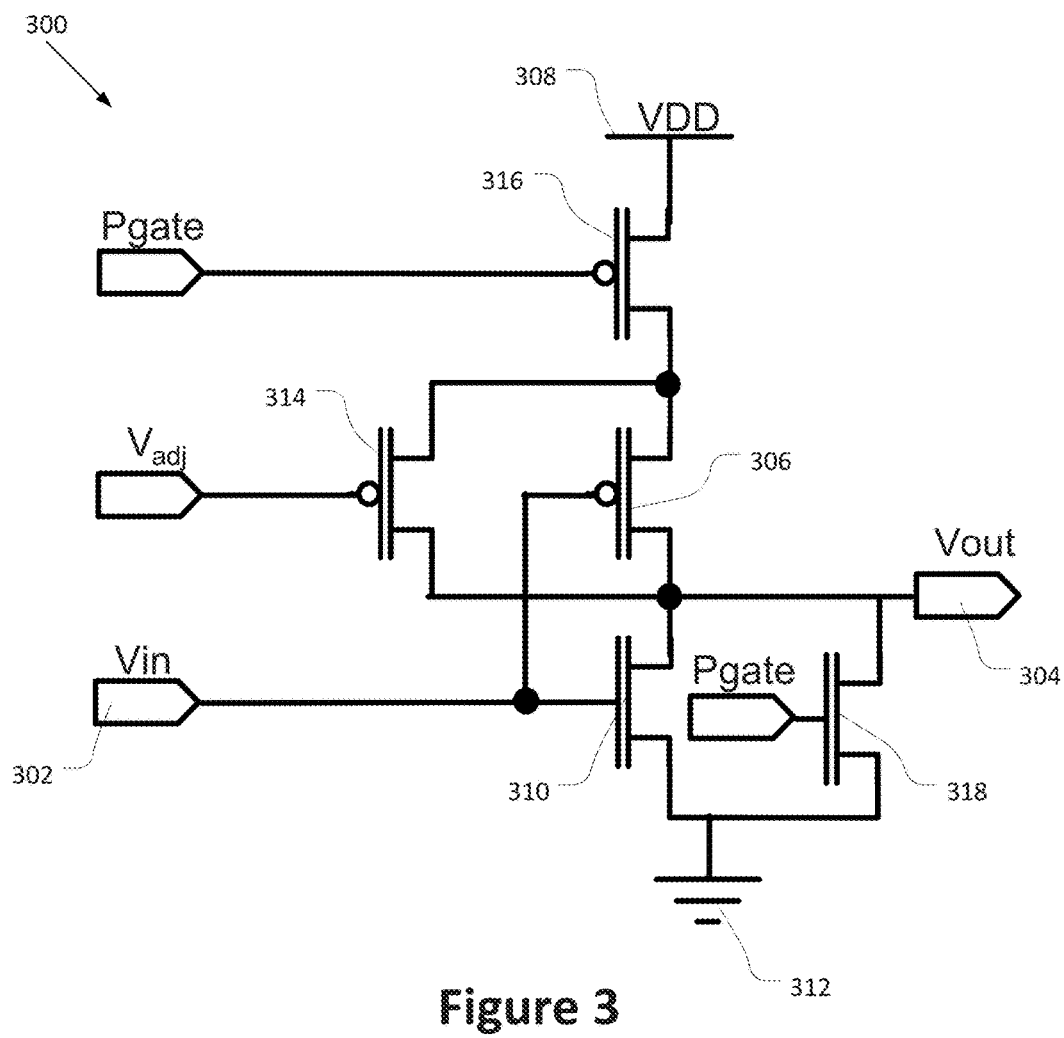
FIG. 3 illustrates an inverter that may be included in an entropy source in accordance with various embodiments.

The drive strength of the inverters 216a-b may be adjustable based on the stochastic feedback. For example, FIG. 3 illustrates an inverter 300 that may correspond to the inverters 216a-b in some embodiments. The inverter 300 may receive an input signal at an input terminal 302 and provide an output signal at an output signal 304. The output signal may be an inverted version of the input signal. The inverter 300 may include a p-type transistor 306 (e.g., p-type metal-oxide-semiconductor (PMOS) transistor) coupled between the output terminal 304 and a supply terminal 308 that receives a supply voltage VDD, and an n-type transistor 310 (e.g., n-type metal-oxide-semiconductor (NMOS) transistor) coupled between the output terminal 304 and a ground potential 312. The gate terminals of the p-type transistor 306 and n-type transistor 310 may be coupled to the input terminal 302 to receive the input signal.

The inverter 300 may further include a control transistor 314 (e.g., a p-type transistor) coupled in parallel with the p-type transistor 306. The control transistor 314 may receive an adjustment voltage Vadj (e.g., an analog voltage) at its gate terminal and may control the drive strength of the inverter 300 based on the value of the adjustment voltage Vadj.

In some embodiments, the inverter 300 may further include a power gate transistor 316 (e.g., a p-type transistor) coupled between the p-type transistor 306 and the supply terminal 308. The power gate transistor 316 may receive a power gate signal Pgate at its gate terminal to selectively power the inverter 300 on or off. For example, the inverter 300 may be powered off when the power gate transistor 316 is off and may be powered on when the power gate transistor 316 is on. The inverter 300 may further include a reset transistor 318 coupled between the output terminal 304 and the ground potential 312 (e.g., in parallel with the n-type transistor 310). The gate terminal of the reset transistor 318 may receive the power gate signal Pgate (e.g., the gate terminal of the reset transistor 318 may be coupled with the gate terminal of the power gate transistor 316). The reset transistor 318 may turn on, responsive to the power gate signal Pgate, when the power gate transistor 316 is off, thereby pulling the output terminal 304 to ground. The reset transistor 318 may be off when the power gate transistor 316 is on.

Referring again to FIG. 2, the stochastic feedback loop 210 may adjust the drive strength of the inverter 216a and/or inverter 216b based on the value of the most recent bit of the output signal. For example, the stepper circuit 206 may charge or discharge capacitor nodes (e.g., capacitor node 218 coupled between capacitors 220a-b and/or capacitor node 222 coupled between capacitors 224a-b) of the charge pump 208 based on the value of the output signal A (e.g., using capacitor control signals Acap and Bcap respectively). In some embodiments, the stochastic feedback loop 210 may adjust the drive strength based on multiple earlier bits and/or based on a combination of earlier and subsequent bits. For example, the stochastic feedback loop 210 may use a digital filter or a weighted average of multiple bits to determine the drive strength adjustment. In some embodiments, a valid option for the stochastic feedback loop 210 may include maintaining the previous value for the drive strengths of the inverters 216a-b.

The charge pump 208 may use the voltages at the capacitor nodes 218 and 222 to provide respective adjustment voltages Vadj to the inverters 216a-b (e.g., to the control transistor 314 of inverter 300). The adjustment voltages may be expressed as a differential voltage Vdiff that corresponds to the voltage difference between the voltage at capacitor node 218 and the voltage at capacitor node 222. In some embodiments, the entropy source 202 may also receive a common mode voltage Vcm.

For example, if the value of a bit of the output signal A is a logic 1, the stepper circuit 206 may discharge the capacitor node 218 and/or charge the capacitor node 222, to increase the likelihood that the next bit of the output signal A will have a value of logic 0. If the value of the output signal A is logic 0, the stepper circuit 206 may charge the capacitor node 218 and/or discharge the capacitor node 222, to increase the likelihood that the next bit of the output signal A will have a value of logic 1. The capacitor nodes 218 and/or 222 may be charged or discharged by a discrete amount of voltage (e.g., referred to as a step size). In some embodiments, the step size may be adjustable, as further discussed below.

In various embodiments, the deterministic feedback circuit 212 may provide a deterministic feedback signal (e.g., via deterministic feedback loop 214) to the entropy source 202 to form an oscillator and thereby generate successive bits for the output signal A and/or output bar signal B. For example, the deterministic feedback circuit 212 determines when the output bit of the entropy source 202 has registered (e.g., when A and B have different logical values), and reset the entropy source 202 responsive to the determination that the output bit has registered. In some embodiments, the deterministic feedback signal may correspond to an XOR function between A and B, a NAND function between A and B, and/or another suitable logical function or set of functions.

The deterministic feedback signal may be provided to the inverters 216a-b (e.g., to the power gate transistor 316 as the power gate signal Pgate) to power off the inverters 216a-b when the entropy source 202 is reset (e.g., using the power gate transistor 316 and reset transistor 318). When both A and B are logic 0, the deterministic feedback signal (e.g., A XOR B) may change from logic 1 to logic 0, thereby causing the inverters 216a-b to be powered up again (e.g., when the power gate transistor 316 turns on). Upon power up, the entropy source 202 will generate the next bit of the output signal A and output bar signal B based on the contention of the inverters 216a-b.

In various embodiments, the deterministic feedback signal may be delayed on the deterministic feedback loop 214 (e.g., by one or more delay cells, such as buffers and/or inverters, as further discussed below) to provide a desired frequency of oscillation of the deterministic feedback loop 214. If the delayed version of the deterministic feedback signal is used to reset the entropy source 202, the inverters 216a-b of the entropy source 202 may draw direct current (DC) current during half of the cycle of the deterministic feedback loop 214 (e.g., while the power gate transistor 316 is on). Accordingly, in various embodiments described herein, the deterministic feedback circuit 212 may pass pre-delay version of the deterministic feedback signal (e.g., a version that bypasses the delay cells) to the entropy source 202 to reset the entropy source 202 when it is detected that the output bit of the entropy source 202 has registered (e.g., when A XOR B is logic 1), and use a delayed version of the deterministic feedback signal (e.g., a version that passes through the delay cells) to power the entropy source 202 back on to generate the subsequent value of the output signal A and/or output bar signal B. Therefore, the entropy source 202 and/or inverters 216a-b may be powered on for less than half of the cycle of the deterministic feedback loop 214. For example, in some embodiments, the entropy source 202 and/or inverters 216a-b may be powered on for less than 45% of the cycle of the deterministic feedback loop 214, such as less than 25% of the cycle. In some embodiments the entropy source 202 and/or inverters 216a-b may be powered on for the minimum duration required to register the output bit irrespective of the cycle.

Figure 4:
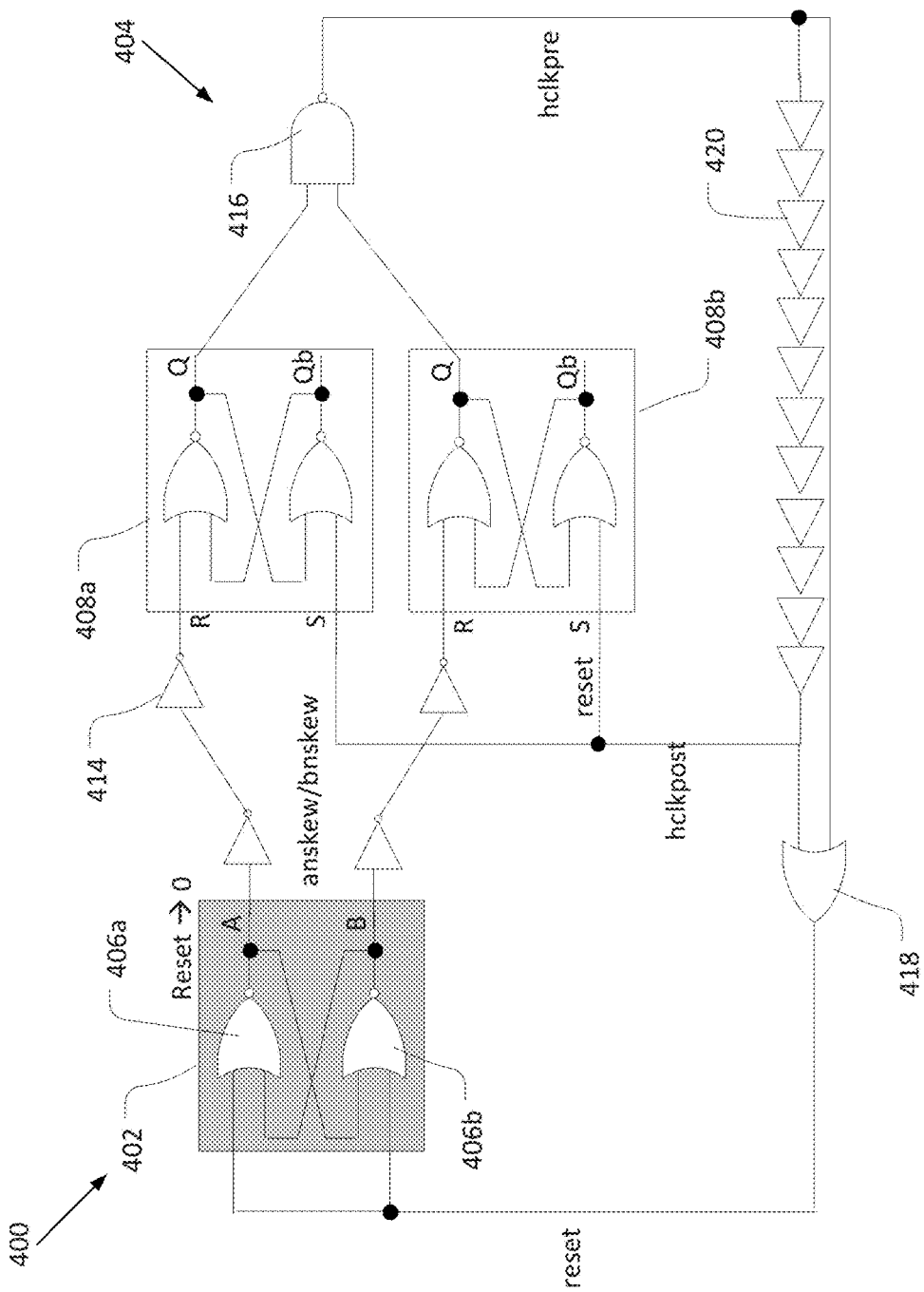
FIG. 4 illustrates an entropy source and a deterministic feedback circuit to provide a deterministic feedback loop, in accordance with various embodiments.

For example, FIG. 4 illustrates a circuit 400 that may correspond to the deterministic feedback loop 214 in accordance with some embodiments. The circuit 400 may include an entropy source 402 and a deterministic feedback circuit 404. The entropy source 402 may be modeled as an SR latch, as shown. For example, the modeled entropy source 402 may include NOR gates 406a-b to generate the output signal A and output bar signal B at respective output terminals. The input terminals of the NOR gate 406a may be coupled to receive the deterministic feedback signal and the output bar signal B, and the input terminals of the NOR gate 406b may be coupled to receive the deterministic feedback signal and the output signal A.

The circuit 400 may further include latches 408a-b (e.g., SR latches) coupled to the respective output terminals of the entropy source 402. Another type of latch or suitable logic may be used for latches 408a-b in other embodiments. The reset (R) input of the latch 408a may be coupled to receive the output signal A from the entropy source 402, and the reset (R) input of the latch 408b may be coupled to receive the output bar signal B from the entropy source 402. The set (S) inputs of both latches 408a-b may be coupled to receive a delayed feedback signal hclkpost, as further discussed below. In some embodiments, the output signal A and output bar signal B may be passed from the entropy source 402 to the respective latch 408a-b via one or more delay cells (e.g., inverters 414).

The output terminals (Q) of the latches 408a-b may be coupled to input terminals of a detection logic 416. In some embodiments, the detection logic 416 may include a NAND gate, as shown in FIG. 4. In other embodiments, the NAND gate may be replaced by other suitable logic, such as an XOR gate. The detection logic 416 may generate an output signal, referred to as pre-delay feedback signal hclkpre. When the output of the entropy source 402 stabilizes (e.g., when the output signal A and output bar signal B settle to different values), the pre-delay feedback signal hclkpre may transition from logic 0 to logic 1.

The circuit 400 may include a split feedback path for the pre-delay feedback signal hclkpre. A reset logic 418 (e.g., OR gate) may receive the pre-delay feedback signal hclkpre and a delayed version of the pre-delay feedback signal (the delayed feedback signal hclkpost). The delayed feedback signal hclkpost may be delayed by delay cells 420 (e.g., buffers and/or inverters). An output signal of the reset logic 418 may be passed to the input terminals of the entropy source 402 as reset signal.

When the pre-delay feedback signal hclkpre transitions from logic 0 to logic 1, the reset logic 418 passes the logic 1 to its output terminal, thereby causing the reset signal to transition to logic 1. The reset signal having logic 1 causes the entropy source 402 to reset.

The latches 408a-b may continue to store the values of the output signal A and output bar signal B, until the delayed feedback signal hclkpost transitions from logic 0 to logic 1 (e.g., after the delay provided by delay cells 420). The latches 408a-b may be traditional complementary metal-oxide-semiconductor (CMOS) latches, and thus may not consume DC current to hold the values of the output signal A and output bar signal B. When the delayed feedback signal hclkpost transitions to logic 1, the output signals (Q) of both latches 408a-b may be logic 1. The NAND gate 416 may transition the pre-delay feedback signal hclkpre to logic 0 in response to both of its inputs being logic 1. When the delayed feedback signal hclkpost thereafter transitions from logic 1 to logic 0, the reset signal passed by reset logic 418 may transition to logic 0, thereby powering the entropy source 402 back on and re-starting the cycle of the deterministic feedback loop.

Accordingly, the circuit 400 may power on the entropy source 402 for only the amount of time it takes for the output of the entropy source 402 to stabilize (e.g., for the bit to register), and the amount of time the entropy source 402 is powered on may not depend on the frequency at which the deterministic feedback loop of the circuit 400 operates. Therefore, the circuit 400 may consume less power than prior entropy source feedback circuits. In some embodiments the entropy source 402 and/or inverters 406a-b may be powered on for the minimum duration required to register the output bit irrespective of the cycle of the deterministic feedback loop 400.

In various embodiments, the frequency of oscillation of the deterministic feedback loop may be adjustable, for example, by adjusting the delay provided by the delay path (e.g., the delay cells 420 of circuit 400). Additionally, or alternatively, the step size of the adjustment voltage Vadj generated by the stochastic feedback loop (e.g., the stepper circuit 206 of circuit 200) may be adjustable.

Figure 5:
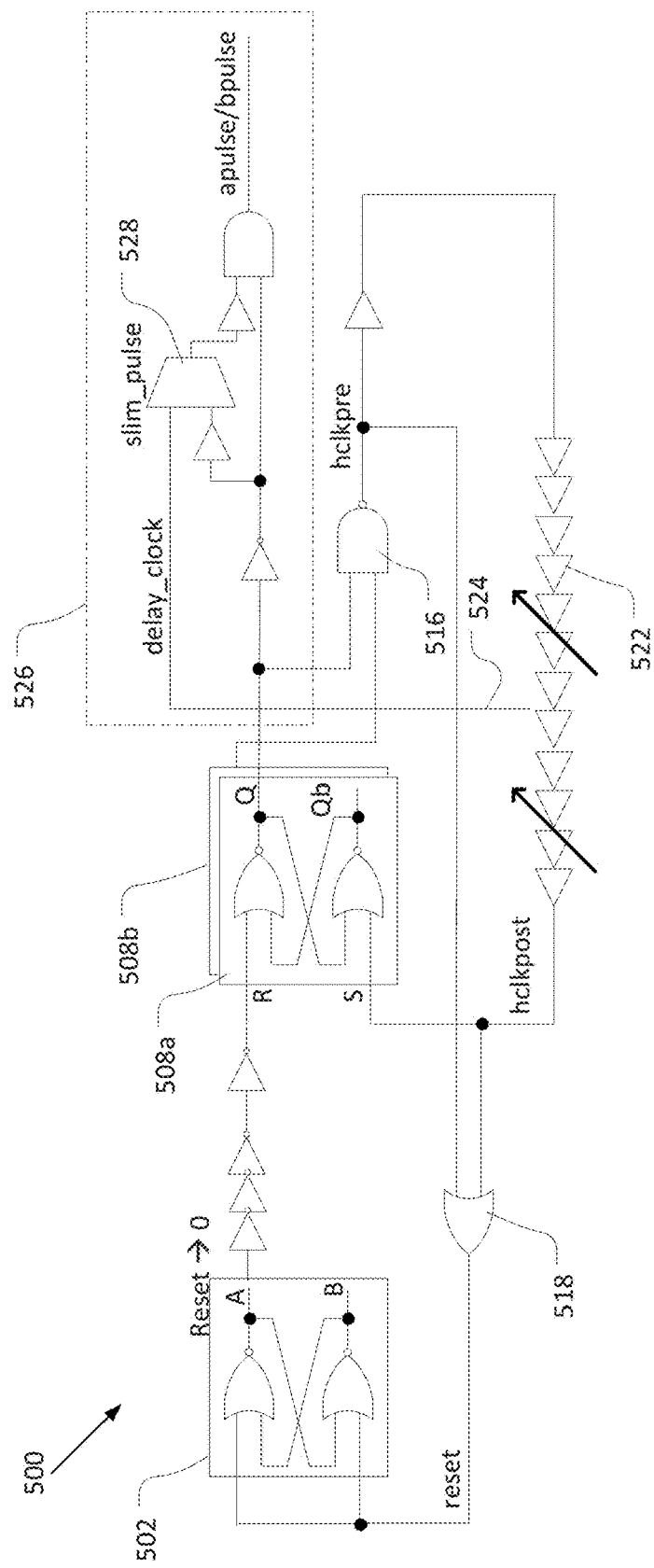
FIG. 5 illustrates an entropy source, a deterministic feedback circuit with an adjustable frequency, and a one-shot circuit configured to generate a pulse signal with an adjustable pulse width, in accordance with various embodiments.

FIG. 5 illustrates a circuit 500 that may provide an adjustable oscillation frequency for the deterministic feedback loop and/or an adjustable step size for the adjustment voltage generated by the stochastic feedback loop, in accordance with various embodiments. The circuit 500 may include an entropy source 502, latches 508a-b, detection logic 516, and reset logic 518 that may be similar to corresponding components of the circuit 400. The circuit 500 may further include an adjustable delay path 522 to provide the delayed feedback signal hclkpost with an adjustable delay with respect to the pre-delay feedback signal hclkpre. The frequency of the deterministic feedback loop may be selected based on any suitable considerations. For example, at higher frequencies, the circuit 500 may use more power and reliability may be decreased, while lower frequencies may sacrifice throughput. The adjustable frequency may additionally or alternatively allow for the frequency to be controlled to facilitate integration with other circuit blocks, such as a serial decorrelator and/or serial-to-parallel converter as described herein.

The adjustable delay path 522 may adjust the provided delay using one or more delay taps to selectively couple different inverters along the delay path. The delay provided by the adjustable delay path 522 may be adjustable in iso-frequency increments (e.g., using non-linear delay taps), in iso-delay increments, or in any combination thereof.

In some embodiments, the circuit 500 may additionally or alternatively include an adjustable tap 524 to tap the signal passed through the adjustable delay path 522 as a delay clock signal. The delay_clock signal may be used by one shot logic 526 to generate apulse and bpulse signals. The one shot logic 526 may further receive the output signal Q of the respective latch 508a-b.

In some embodiments, the circuit 500 may include a first one shot logic 526 to generate the apulse signal based on the output signal Q of the latch 508a (e.g., corresponding to the output signal A) and the delay_clock signal, and a second one-shot logic 526 to generate the bpulse signal based on the output signal Q of the latch 508b (e.g., corresponding to the output bar signal B) and the delay_clock signal. The first one shot logic 526 and/or second one shot logic 526 may be included in the one shot circuit 204 of FIG. 2 in some embodiments.

The apulse and bpulse signals may have a pulse with a pulse width that is based on the amount of delay in the delay_clock signal provided by the adjustable tap 524. The one shot logic 526 may provide the apulse signal with the pulse when the output signal A is logic 1, and may provide the bpulse signal with the pulse when the output bar signal B is logic 1. The step size of the adjustment voltage Vadj provided to the inverters of the entropy source may be based on the pulse width of the apulse and bpulse signals (e.g., as further discussed with respect to stepper and charge pump circuit 600 of FIG. 6).

In some embodiments, the use of the delay_clock signal to provide a pulse signal with an adjustable pulse width may be selectively deactivated (e.g., using slim_pulse signal coupled to a selector input of a multiplexer 528). When the adjustable pulse width is deactivated, the circuit 500 may use a fixed-duration one-shot delay based directly on the outputs of latches 508a-b.

The pulse width of the apulse and bpulse signals may be selected based on any suitable considerations. For example, it may be desirable for the step size of the adjustment voltage to be smaller than the noise source (e.g., thermal noise, power source noise) that causes variation in the output signal of the entropy source 502. The entropy of the output signal of the entropy source may generally increase for a smaller pulse width. However, a larger step size of the adjustment voltage may allow the stochastic feedback circuit to respond more quickly to changes in the response of the entropy source 502.

In some cases, it may not be possible or practical to determine an appropriate frequency of the deterministic feedback loop (e.g., the delay provided by the adjustable delay path 522) and/or an appropriate step size for the adjustment voltage until after the random number generator is designed and/or fabricated. Accordingly, in some embodiments the frequency and/or step size may be programmed for the circuit 500 later in the manufacturing/testing process. For example, delay provided by the adjustable delay path 522 and/or the position of adjustable tap 524 may be written to registers, fuses, or otherwise programmed into the circuit 500 so that the frequency and/or step size stays constant during operation of the circuit 500. Alternatively, the frequency of the deterministic feedback loop and/or step size of the adjustment voltage Vadj may be adjusted dynamically during operation of the circuit 500, for example based on changing conditions.

Figure 6:
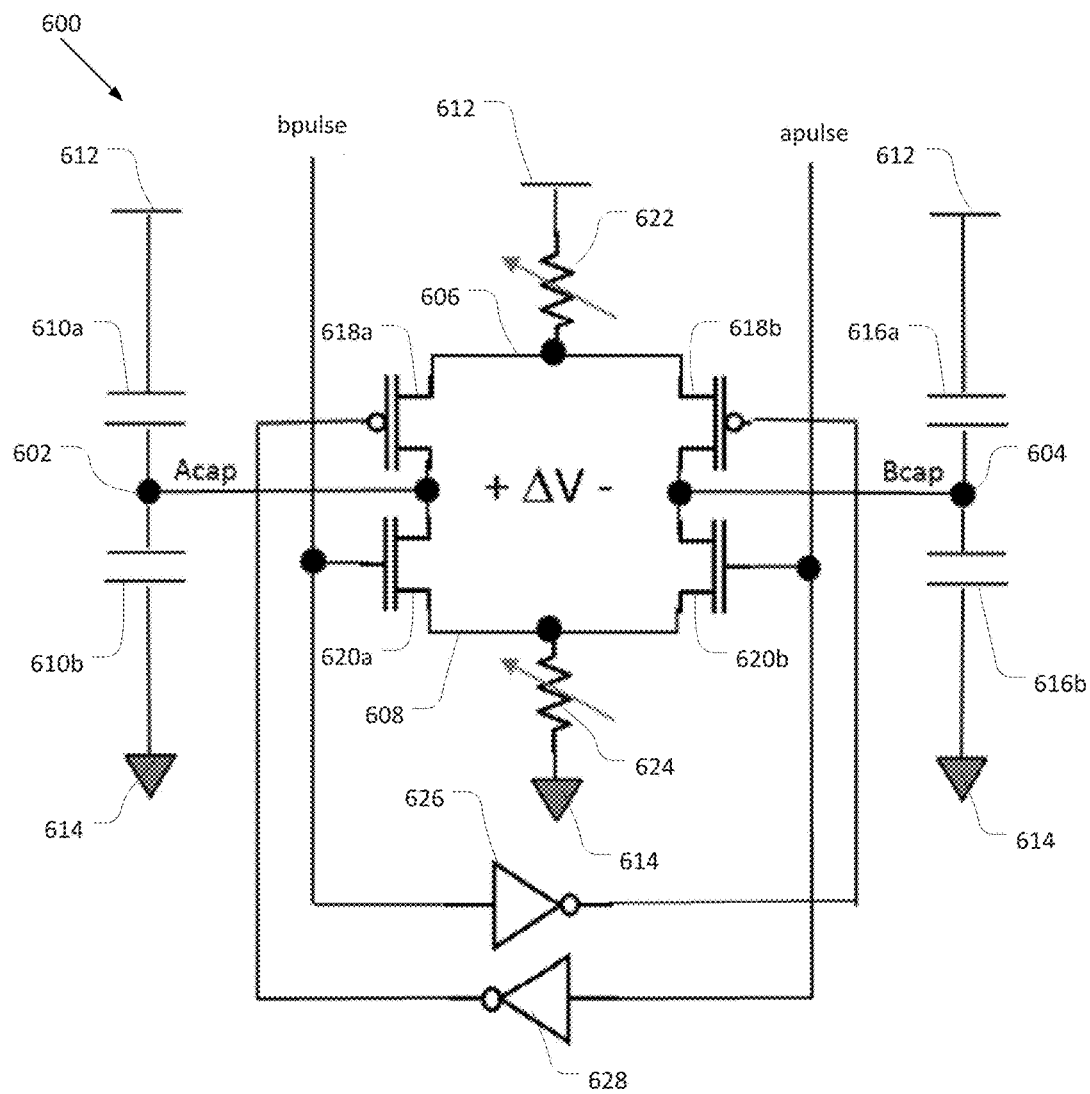
FIG. 6 illustrates a stepper circuit in accordance with various embodiments.

FIG. 6 illustrates a stepper circuit 600 (hereinafter "circuit 600") in accordance with various embodiments. The stepper circuit 600 may correspond to the stepper circuit 206 and/or capacitors 220*a-b* and 224*a-b* of circuit 200.

The circuit 600 may receive the apulse and bpulse signals from the one shot circuit (e.g., one shot logic 526 of circuit 500 and/or one shot circuit 204 of circuit 200) and may selectively charge or discharge Acap node 602 and/or Bcap node 604 based on the pulse of the apulse signal or bpulse signal, as further described below. The circuit 600 may use a common pull-up node 606 and pull-down node 608 for charging/discharging both the Acap node 602 and Bcap node 604, thereby ensuring that a pulse of the apulse signal and a pulse of the bpulse signal having a same pulse width cause respective voltage changes on the Acap node 602 (or Bcap node 604) of equal magnitude.

The Acap node 602 of the circuit 600 may be coupled between a pair of capacitors 610*a-b* that are coupled in series between a supply rail 612 and a ground potential 614, and the Bcap node 604 may be coupled between a pair of capacitors 616*a-b* that are coupled in series between the supply rail 612 and the ground potential 614. The circuit 600 may further include pull-up transistors 618*a-b* coupled between the respective Acap node 602 or Bcap node 604 and the pull-up node 606, and pull-down transistors 620*a-b* coupled between the respective Acap node 602 or Bcap node 604 and the pull-down node 608. In some embodiments, a first tuning resistor 622 may be coupled between the pull-up node 606 and the supply rail 612 and a second tuning resistor may 624 be coupled between the pull-down node 608 and the ground potential 614. The first tuning resistor 622 and/or second tuning resistor 624 may be adjustable resistors (e.g., potentiometers) in some embodiments. The first tuning resistor 622 and/or second tuning resistor 624 may control the tuning range over which the circuit 600 can adjust the voltage at the Acap node 602 and/or Bcap node 604.

In various embodiments, the gate terminal of the pull-down transistor 620*a* may receive the bpulse signal and the gate terminal of the pull-up transistor 618*b* may receive an inverted version of the bpulse signal (e.g., via an inverter 626). The gate terminal of the pull-down transistor 620*b* may receive the apulse signal and the gate terminal of the pull-up transistor 618*a* may receive an inverted version of the apulse signal (e.g., via an inverter 628).

Accordingly, when the apulse and bpulse signals are not asserted (e.g., having a value of logic 0), both pull-up transistors 618*a-b* and both pull-down transistors 620*a-b* may be off, and the voltage levels at the Acap node 602 and Bcap node 604 may be held steady. When the apulse signal has a pulse of logic 1, the pull-up transistor 618*a* may turn on for the duration of the pulse to increase the voltage at the Acap node 602, and the pull-down transistor 620*b* may turn on for the duration of the pulse to reduce the voltage at Bcap node 604. On the other hand, when the bpulse signal has a pulse of logic 1, the pull-up transistor 618*b* may turn on for the duration of the pulse to increase the voltage at the Bcap node 604, and the pull-down transistor 620*a* may turn on for the duration of the pulse to reduce the voltage at the Acap node 602. The amount of voltage that is added or subtracted from the respective Acap node 602 or Bcap node 604 may be based on the duration (width) of the pulse. Additionally, the amount of voltage that is added or subtracted may be proportional to the resistance values of the resistors 622 and 624 and/or the voltage level of the power supply (e.g., at power supply rail 612). In some embodiments, the pulse width may be adjustable, for example, as discussed with reference to FIG. 5.

Since the circuit 600 uses the same pull-up node 606 and pull-down node 608 (and the same resistors 622 and 624) for charging/discharging based on the apulse signal and for charging/discharging based on the bpulse signal, pulses of the same width on either the apulse signal or bpulse signal will cause a corresponding voltage change on the Acap node 602 (and/or Bcap node 604) of the same magnitude (and opposite polarity). In contrast, prior stepper and charge pump circuits used separate pull-up nodes, pull-down nodes, and resistors for the apulse branch and bpulse branch. Accordingly, variation/mismatch in the resistors of the different branches would result in a steady state bias (e.g., drift) of the voltage difference between the Acap node and Bcap node from equal-width pulses of the apulse signal and the bpulse signal. The circuit 600 prevents the drift, and thereby provides an even bias of logic 1s and logic 0s in the random bitstream generated by the entropy source.

Figure 7:
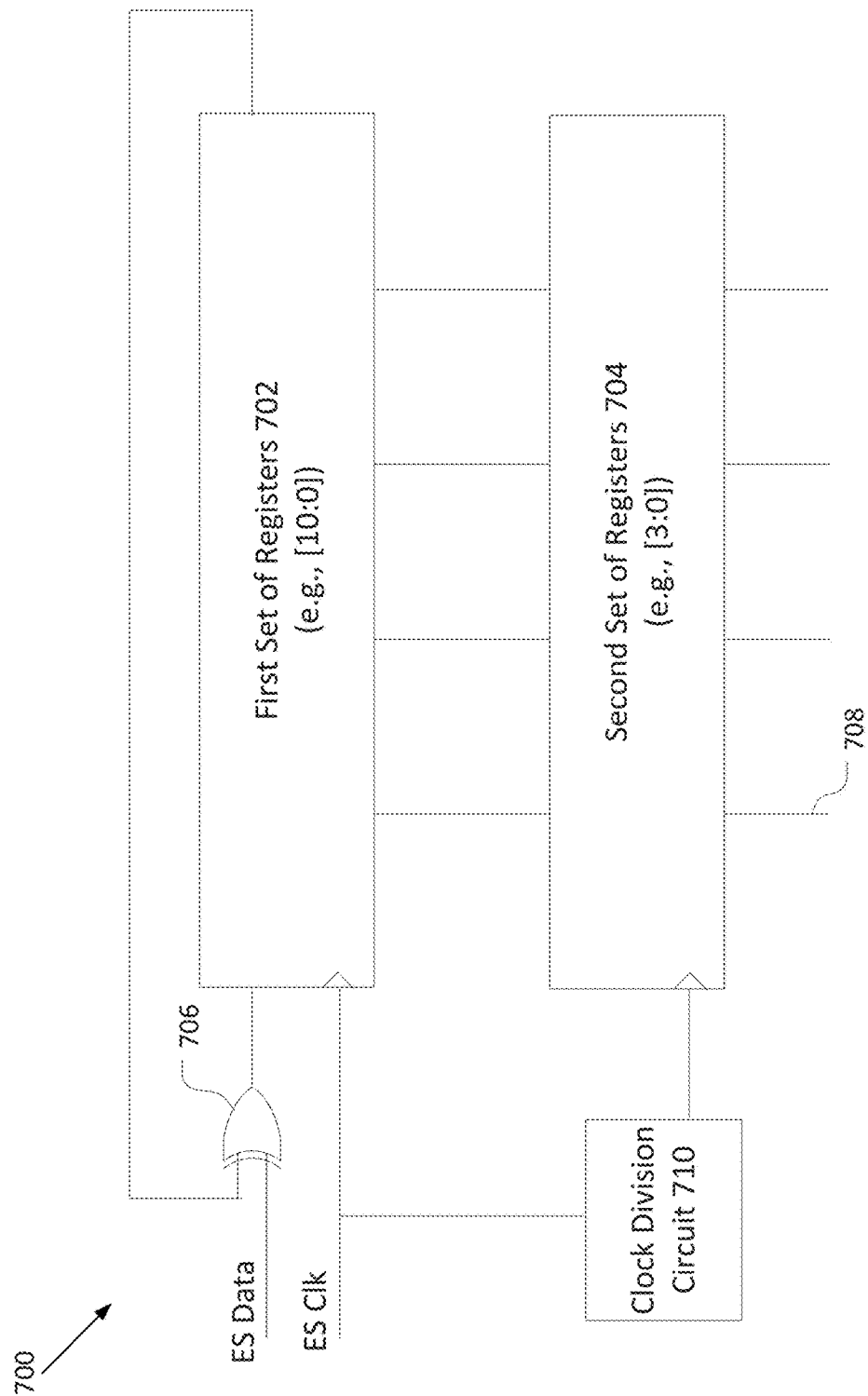
FIG. 7 illustrates a serial decorrelator circuit in accordance with various embodiments.

FIG. 7 illustrates a serial decorrelator circuit 700 in accordance with various embodiments. The serial decorrelator circuit 700 may receive the output signal (ES Data) from the entropy source and process it to generate a decorrelated output signal. The decorrelated output signal may provide increased entropy compared with the output signal of the entropy source. For example, the serial decorrelator circuit 700 may XOR the output signal from the entropy source with a prior version of the output signal, and/or may reduce the number of bits in the decorrelated output signal compared with the output signal ES Data from the entropy source, to increase the entropy of the decorrelated output signal.

As shown in FIG. 7, the circuit 700 may include a first set of registers 702 and a second set of registers 704. The circuit 700 may further include an XOR gate 706. The XOR gate 706 may receive as inputs the output signal ES Data from the entropy source and the output signal of the last register 702 of the first set of registers 702. The output of the XOR gate 706 may be passed to the data input of the first register 702 of the first set of registers. Thus, the first set of registers 702 may receive an XORed version of the output signal of the entropy source with a prior value of the output signal. The XOR function may increase the entropy of the bits stored by the first set of registers 702.

In other embodiments, the XOR gate 706 may be placed elsewhere in the signal path of the circuit 700. The XOR gate 706 may be placed in a manner that results in recursion or in a manner that does not. Additionally, or alternatively, in some embodiments, the circuit 700 may be capable of selectively bypassing the XOR gate 706 to turn off the XOR function of the output signal.

In various embodiments, the first set of registers 702 may store a first number of bits of the data signal passed through the registers 702 (e.g., the XORed version of the output signal ES Data). The second set of registers 704 may sample a second number of the bits stored by the first set of registers 702, where the second number is less than or equal to the first number. The bits stored by the second set of registers 704 may be used as the decorrelated output signal of the circuit 700 (e.g., at output terminals 708).

The first number and second numbers may have any suitable values. In some embodiments, the first number may be a prime number. In one non-limiting embodiment, the first number may be 11 and/or the second number may be 4.

The clock signal ES Clk used by the circuit 700 (e.g., received by the clock input of the registers 702) may correspond to the feedback signal generated by the deterministic feedback loop of the random number generator (e.g., the hclkpost signal described with reference to FIG. 4). The circuit 700 may include a clock division circuit 710 to reduce the frequency of the clock signal ES Clk and pass the reduced frequency clock signal to the clock inputs of the registers 704. Accordingly, during each cycle of the reduced frequency clock signal, the first set of registers 702 may store the first number of bits of the XORed output signal ES Data, and the second set of registers 704 may sample the second number of the bits and output the sampled bits as the decorrelated output signal.

Referring again to FIG. 1, the serial decorrelator circuit 108 may pass the decorrelated output signal to the serial-to-parallel converter 110. The serial-to-parallel converter 110 may convert the serial bitstream(s) of the decorrelated output signal into a parallel bit string that corresponds to a random number generated by the circuit 100. For example, in one non-limiting example, the serial-to-parallel converter 110 may receive the 4-bit wide signal from the second set of registers 704 and convert it to a 32-bit wide output bit string.

Figure 8:
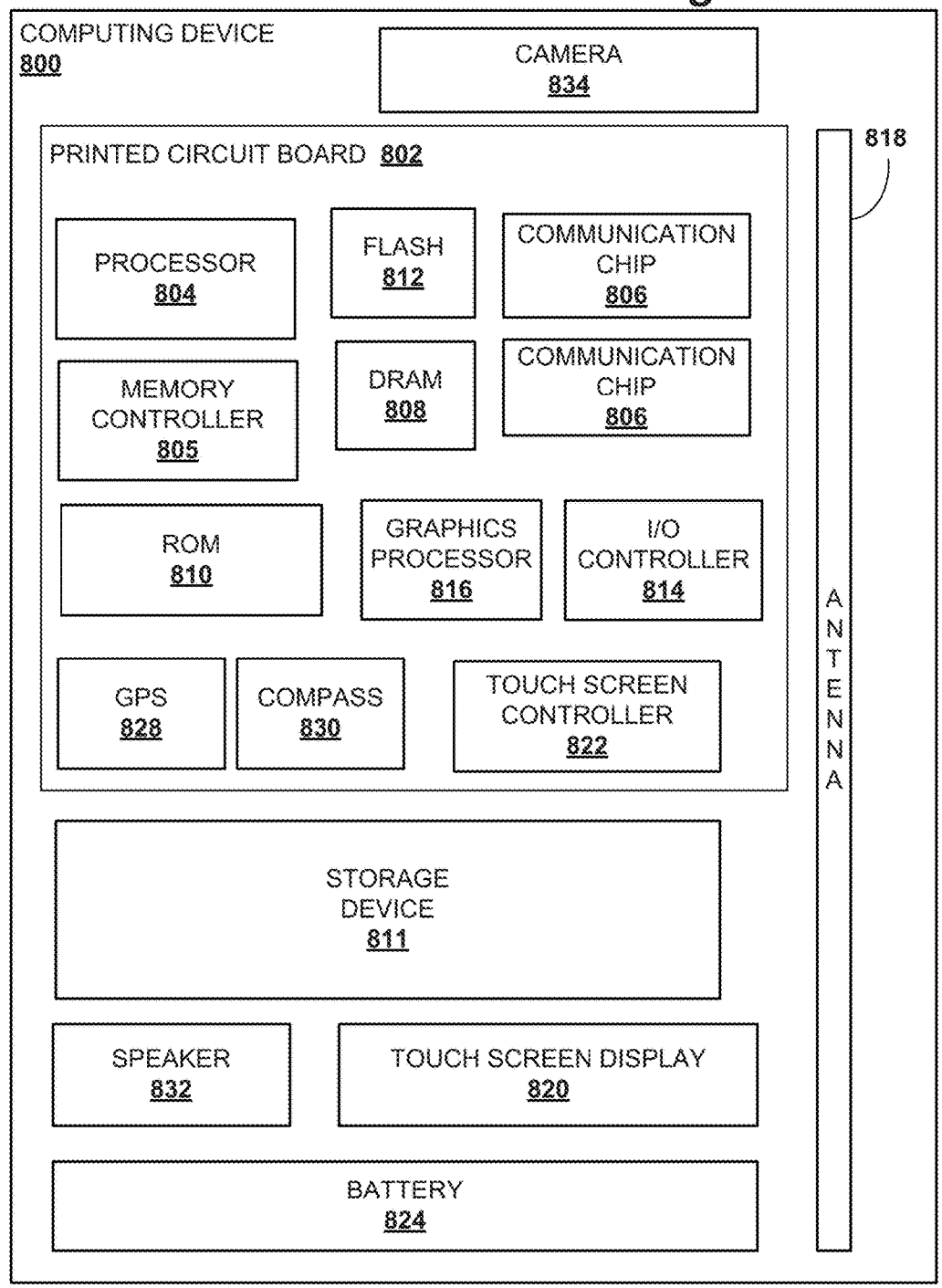
FIG. 8 illustrates an example system configured to employ the apparatuses and methods described herein, in accordance with various embodiments.

FIG. 8 illustrates an example computing device 800 that may employ the apparatuses and/or methods described herein (e.g., circuit 100, circuit 200, circuit 300, circuit 400, circuit 500, circuit 600, and/or circuit 700), in accordance with various embodiments. As shown, computing device 800 may include a number of components, such as one or more processor(s) 804 (one shown) and at least one communication chip 806. In various embodiments, the one or more processor(s) 804 each may include one or more processor cores. In various embodiments, the at least one communication chip 806 may be physically and electrically coupled to the one or more processor(s) 804. In further implementations, the communication chip 806 may be part of the one or more processor(s) 804. In various embodiments, computing device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, memory controller 805, volatile memory (e.g., dynamic random access memory (DRAM) 808), non-volatile memory such as read only memory (ROM) 810, flash memory 812, storage device 811 (e.g., a hard-disk drive (HDD)), an I/O controller 814, a digital signal processor (not shown), a crypto processor (not shown), a graphics processor 816, one or more antenna 818, a display (not shown), a touch screen display 820, a touch screen controller 822, a battery 824, an audio codec (not shown), a video codec (not shown), a global positioning system (GPS) device 828, a compass 830, an accelerometer (not shown), a gyroscope (not shown), a speaker 832, a camera 834, and a mass storage device (such as hard disk drive, a solid state drive, compact disk (CD), digital versatile disk (DVD)) (not shown), and so forth. In various embodiments, the processor 804 may be integrated on the same die with other components to form a System on Chip (SoC).

In some embodiments, the one or more processor(s) 804, flash memory 812, and/or storage device 811 may include associated firmware (not shown) storing programming instructions configured to enable computing device 800, in response to execution of the programming instructions by one or more processor(s) 804, to practice all or selected aspects of the methods described herein. In various embodiments, these aspects may additionally or alternatively be implemented using hardware separate from the one or more processor(s) 804, flash memory 812, or storage device 811.

In various embodiments, one or more components of the computing device 800 may include the circuit 100, circuit 200, circuit 300, circuit 400, circuit 500, circuit 600, and/or circuit 700 described herein. For example, the circuit 100, circuit 200, circuit 300, circuit 400, circuit 500, circuit 600, and/or circuit 700 may be included in processor 804, communication chip 806, I/O controller 814, memory controller 805, and/or another component of computing device 800. The circuit 100, circuit 200, circuit 300, circuit 400, circuit 500, circuit 600, and/or circuit 700 may be used to generate a random number. The random number may be used, for example, for encryption (e.g., to encrypt data stored by the computing device 800, such as by the flash memory 812 or storage device 811. Additionally, or alternatively, the random number may be used for authentication (e.g., to authenticate the computing device 800 with another device and/or to authenticate a component of the computing device 800 with another component of the computing device 800). For example, the computing device 800 may receive one or more challenges from another device, and may generate respective one or more responses based on the one or more challenges.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 800 may be any other electronic device that processes data.

Some non-limiting Examples of various embodiments are provided below.

Example 1 is a random number generator circuit comprising: an entropy source to generate an output signal; and a deterministic feedback circuit coupled to the entropy source in a deterministic feedback loop to generate successive bits of the output signal. The deterministic feedback circuit includes: detection logic to detect when a first bit of the output signal of the entropy source has registered; a pre-delay feedback path to cause the entropy source to power off responsive to the detection; and a post-delay feedback path to cause the entropy source to power on, after the entropy source is powered off, to generate a second bit of the output signal, wherein the post-delay feedback path includes one or more delay cells that are bypassed by the pre-delay feedback path.

Example 2 is the circuit of Example 1, wherein the entropy source is to be powered on for less than 45% of a cycle of the deterministic feedback loop.

Example 3 is the circuit of Example 1 or Example 2, wherein the detection logic is to output a pre-delay feedback signal based on the detection, wherein the pre-delay feedback path and the post-delay feedback path are coupled to receive the pre-delay feedback signal, and wherein the deterministic feedback circuit further includes: reset logic to receive the pre-delay feedback signal via the pre-delay feedback path and a post-delay feedback signal via the post-delay feedback path, wherein the reset logic is coupled to the entropy source to power off and power on the entropy source based on the pre-delay signal and the post-delay signal.

Example 4 is the circuit of Example 3, wherein the deterministic feedback circuit further comprises: a first latch having a first input to receive the output signal from the entropy source, a second input to receive the post-delay feedback signal, and an output coupled to a first input of the detection logic; and a second latch having a first input to receive an output bar signal from the entropy source, a second input to receive the post-delay feedback signal, and an output coupled to a second input of the detection logic, wherein the output bar signal is a logical inverse of the output signal of the entropy source.

Example 5 is the circuit of any one of Examples 1 to 4, wherein the detection logic is to detect when the first bit of the output signal has registered based on the output signal having a different voltage level than an output bar signal of the entropy source.

Example 6 is the circuit of any one of Examples 1 to 5, wherein a delay provided by the post-delay feedback path is adjustable.

Example 7 is the circuit of any one of Examples 1 to 6, wherein a time period that the entropy source is powered on during a cycle of the deterministic feedback loop is independent of a length of the cycle.

Example 8 is the circuit of any one of Examples 1 to 7, further comprising: a one shot circuit to generate a pulse signal based on a value of the first bit, the pulse signal having a pulse with an adjustable pulse width; and a stepper circuit to control a stochastic feedback signal provided to the entropy source based on the pulse signal, wherein the stochastic feedback signal is to control a drive strength of a pair of contentious components of the entropy source, and wherein a step size of a change in the drive strength of the pair of contentious components is based on the pulse width of the pulse signal.

Example 9 is the circuit of Example 8, further comprising an adjustable tap coupled to delay cells of the post-delay feedback path of the deterministic feedback circuit to control the adjustable pulse width.

Example 10 is the circuit of any one of Examples 1 to 9, further comprising: a one shot circuit to generate a first pulse signal and a second pulse signal based on the bits of the output signal, wherein the one shot circuit is to provide the first pulse signal with a pulse if the first bit has a first logic value and is to provide the second pulse signal with a pulse if the first bit has a second logic value; a stepper circuit coupled to the one shot circuit, the stepper circuit including: a first capacitor node to provide a first stochastic feedback signal for the entropy source; a second capacitor node to provide a second stochastic feedback signal for the entropy source; and a common pull-up node to be selectively coupled to the first capacitor node responsive to the pulse in the first pulse signal and to be selectively coupled to the second capacitor node responsive to the pulse in the second pulse signal.

Example 11 is the circuit of Example 10, wherein the stepper circuit further includes: a tuning resistor coupled between the common pull-up node and a power supply rail; a first pull-up transistor coupled between the common pull-up node and the first capacitor node; and a second pull-up transistor coupled between the common pull-up node and the second capacitor node.

Example 12 is the circuit of any one of Examples 1 to 11, further comprising a serial decorrelator circuit to: XOR individual bits of the output signal of the entropy source with a respective prior bit of the output signal that is a first number of bits prior to the individual bit to obtain XORed bits; subsample the XORed bits; and output the subsampled XORed bits to generate a random number.

Example 13 is the circuit of Example 12, wherein the first number is a prime number.

Example 14 is a random number generator circuit comprising: an entropy source to generate an output signal; and a deterministic feedback circuit coupled to the entropy source in a deterministic feedback loop to generate successive bits of the output signal. The deterministic feedback circuit includes: detection logic to detect when a first bit of the output signal of the entropy source has registered; and delay cells coupled between the detection logic and the entropy source to provide a deterministic feedback signal to the entropy source to cause the entropy source to generate a second bit of the output signal, wherein a delay provided by the delay cells is adjustable.

Example 15 is the circuit of Example 14, wherein the delay cells are included in a post-delay feedback path to cause the entropy source to generate the second bit of the output signal, and wherein the circuit further includes a pre-delay feedback path coupled between the detection logic and the entropy source to reset the entropy source responsive to the detection by the detection logic, wherein the pre-delay feedback path bypasses the delay cells.

Example 16 is the circuit of Example 14 or Example 15, wherein the deterministic feedback circuit further includes: reset logic to receive a pre-delay feedback signal from the pre-delay feedback path and a post-delay feedback signal from the post-delay feedback path, wherein the reset logic is coupled to the entropy source to reset and power on the entropy source based on the pre-delay signal and the post-delay signal.

Example 17 is the circuit of Example 16, further comprising: a first latch having a first input to receive the output signal from the entropy source, a second input to receive the post-delay feedback signal, and an output coupled to a first input of the detection logic; and a second latch having a first input to receive an output bar signal from the entropy source, a second input to receive the post-delay feedback signal, and an output coupled to a second input of the detection logic, wherein the output bar signal is a logical inverse of the output signal of the entropy source.

Example 18 is the circuit of any one of Examples 14 to 17, further comprising a stochastic feedback loop including: a one shot circuit to generate a pulse signal based on a value of the first bit, the pulse signal having a pulse with an adjustable pulse width that is derived using the delay cells of the deterministic feedback circuit; and a stepper circuit to control a stochastic feedback signal provided to the entropy source based on the pulse signal, wherein the stochastic feedback signal is to control a drive strength of a pair of contentious components of the entropy source, and wherein a step size of a change in the drive strength of the pair of contentious components is based on the pulse width of the pulse signal.

Example 19 is a random number generator circuit, comprising: an entropy source to generate an output signal, the entropy source including a pair of contentious components with respective drive strengths that are adjustable responsive to respective first and second adjustment signals; and a stochastic feedback loop to provide the adjustment signal to the entropy source based on the output signal of the entropy source. The stochastic feedback loop includes: a one shot circuit to generate a first pulse signal and a second pulse signal based on the output signal, wherein the one shot circuit is to provide the first pulse signal with a pulse if the output signal has a first logic value and is to provide the second pulse signal with a pulse if the output signal has a second logic value; a stepper circuit coupled to the one shot circuit. The stepper circuit includes: a first capacitor node to provide the first adjustment signal for the entropy source; a second capacitor node to provide the second adjustment signal for the entropy source; a common pull-up node; a first pull-up transistor to selectively couple the first capacitor node to the common pull-up node responsive to the pulse in the first pulse signal; and a second pull-up transistor to selectively couple the second capacitor node to the common pull-down node responsive to the pulse in the second pulse signal.

Example 20 is the circuit of Example 19, wherein the stepper circuit further includes: a tuning resistor coupled between the common pull-up node and a power supply rail.

Example 21 is the circuit of Example 20, wherein the tuning resistor is a first tuning resistor, and wherein the stepper circuit further includes: a common pull-down node; a second tuning resistor coupled between the common pull-down node and a ground potential; a first pull-down transistor to selectively couple the second capacitor node to the common pull-down node responsive to the pulse in the first pulse signal; and a second pull-down transistor to selectively couple to the first capacitor node to the common pull-down node responsive to the pulse in the second pulse signal.

Example 22 is a random number generator circuit comprising: an entropy source to generate an output signal; and a serial decorrelator circuit coupled to the entropy source. The serial decorrelator circuit is to: XOR individual bits of the output signal of the entropy source with a respective prior bit of the output signal that is a first number of bits prior to the individual bit to obtain XORed bits; subsample the XORed bits; and output the subsampled XORed bits to generate a random number.

Example 23 is the circuit of Example 22, wherein the first number is a prime number.

Example 24 is the circuit of Example 22 or Example 23, wherein the serial decorrelator circuit includes: an XOR gate to perform the XOR of the individual bits to obtain the XORed bits; a first set of registers to store the first number of the XORed bits; a second set of registers to subsample the XORed bits; and a clock division circuit to divide a clock signal used by the first set of registers and provide the divided clock signal to the second set of registers.

Example 25 is the circuit of Example 24, wherein the clock signal is generated by a deterministic feedback loop coupled with the entropy source.

Example 26 is a computer system comprising: the random number generator circuit of any one of Examples 1 to 25; a processor coupled to the random number generator; and one or more of: a memory coupled to the processor; a display coupled to the processor, one or more antennas coupled to the processor; or a communications chip coupled to the processor.

Example 27 is the computer system of Example 26, wherein the random number generator circuit is included in the processor.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A circuit comprising:
an entropy source to generate an output signal; and
a deterministic feedback circuit coupled to the entropy source in a deterministic feedback loop to generate successive bits of the output signal, wherein the deterministic feedback circuit includes:
  detection logic to detect when a first bit of the output signal of the entropy source has registered;

a pre-delay feedback path to cause the entropy source to power off responsive to the detection; and a post-delay feedback path to cause the entropy source to power on, after the entropy source is powered off, to generate a second bit of the output signal, wherein the post-delay feedback path includes one or more delay cells that are bypassed by the pre-delay feedback path.

2. The circuit of claim 1, wherein the entropy source is to be powered on for less than 45% of a cycle of the deterministic feedback loop.

3. The circuit of claim 1, wherein the detection logic is to output a pre-delay feedback signal based on the detection, wherein the pre-delay feedback path and the post-delay feedback path are coupled to receive the pre-delay feedback signal, and wherein the deterministic feedback circuit further includes:
reset logic to receive the pre-delay feedback signal via the pre-delay feedback path and a post-delay feedback signal via the post-delay feedback path, wherein the reset logic is coupled to the entropy source to power off and power on the entropy source based on the pre-delay signal and the post-delay signal.

4. The circuit of claim 3, wherein the deterministic feedback circuit further comprises:
a first latch having a first input to receive the output signal from the entropy source, a second input to receive the post-delay feedback signal, and an output coupled to a first input of the detection logic; and
a second latch having a first input to receive an output bar signal from the entropy source, a second input to receive the post-delay feedback signal, and an output coupled to a second input of the detection logic, wherein the output bar signal is a logical inverse of the output signal of the entropy source.

5. The circuit of claim 1, wherein the detection logic is to detect when the first bit of the output signal has registered based on the output signal having a different voltage level than an output bar signal of the entropy source.

6. The circuit of claim 1, wherein a delay provided by the post-delay feedback path is adjustable.

7. The circuit of claim 1, wherein a time period that the entropy source is powered on during a cycle of the deterministic feedback loop is independent of a length of the cycle.

8. The circuit of claim 1, further comprising:
a one shot circuit to generate a pulse signal based on a value of the first bit, the pulse signal having a pulse with an adjustable pulse width; and
a stepper circuit to control a stochastic feedback signal provided to the entropy source based on the pulse signal, wherein the stochastic feedback signal is to control a drive strength of a pair of contentious components of the entropy source, and wherein a step size of a change in the drive strength of the pair of contentious components is based on the pulse width of the pulse signal.

9. The circuit of claim 8, further comprising an adjustable tap coupled to delay cells of the post-delay feedback path of the deterministic feedback circuit to control the adjustable pulse width.

10. The circuit of claim 1, further comprising:
a one shot circuit to generate a first pulse signal and a second pulse signal based on the bits of the output signal, wherein the one shot circuit is to provide the first pulse signal with a pulse if the first bit has a first logic value and is to provide the second pulse signal with a pulse if the first bit has a second logic value; and
a stepper circuit coupled to the one shot circuit, the stepper circuit including:
a first capacitor node to provide a first stochastic feedback signal for the entropy source;
a second capacitor node to provide a second stochastic feedback signal for the entropy source;
a common pull-up node to be selectively coupled to the first capacitor node responsive to the pulse in the first pulse signal and to be selectively coupled to the second capacitor node responsive to the pulse in the second pulse signal.

11. The circuit of claim 10, wherein the stepper circuit further includes:
a tuning resistor coupled between the common pull-up node and a power supply rail;
a first pull-up transistor coupled between the common pull-up node and the first capacitor node; and
a second pull-up transistor coupled between the common pull-up node and the second capacitor node.

12. The circuit of claim 1, further comprising a serial decorrelator circuit to:
XOR individual bits of the output signal of the entropy source with a respective prior bit of the output signal that is a first number of bits prior to the individual bit to obtain XORed bits;
subsample the XORed bits; and
output the subsampled XORed bits to generate a random number.

13. The circuit of claim 12, wherein the first number is a prime number.

14. A circuit comprising:
an entropy source to generate an output signal; and
a deterministic feedback circuit coupled to the entropy source in a deterministic feedback loop to generate successive bits of the output signal, wherein the deterministic feedback circuit includes:
detection logic to detect when a first bit of the output signal of the entropy source has registered; and
delay cells coupled between the detection logic and the entropy source to provide a deterministic feedback signal to the entropy source to cause the entropy source to generate a second bit of the output signal, wherein a delay provided by the delay cells is adjustable.

15. The circuit of claim 14, wherein the delay cells are included in a post-delay feedback path to cause the entropy source to generate the second bit of the output signal, and wherein the circuit further includes a pre-delay feedback path coupled between the detection logic and the entropy source to reset the entropy source responsive to the detection by the detection logic, wherein the pre-delay feedback path bypasses the delay cells.

16. The circuit of claim 14, wherein the deterministic feedback circuit further includes:
reset logic to receive a pre-delay feedback signal from a pre-delay feedback path and a post-delay feedback signal from a post-delay feedback path, wherein the reset logic is coupled to the entropy source to reset and power on the entropy source based on the pre-delay signal and the post-delay signal.

17. The circuit of claim 16, further comprising:
a first latch having a first input to receive the output signal from the entropy source, a second input to receive the post-delay feedback signal, and an output coupled to a first input of the detection logic; and a second latch having a first input to receive an output bar signal from the entropy source, a second input to receive the post-delay feedback signal, and an output coupled to a second input of the detection logic, wherein the output bar signal is a logical inverse of the output signal of the entropy source.

18. The circuit of claim 14, further comprising a stochastic feedback loop including:
a one shot circuit to generate a pulse signal based on a value of the first bit, the pulse signal having a pulse with an adjustable pulse width that is derived using the delay cells of the deterministic feedback circuit; and
a stepper circuit to control a stochastic feedback signal provided to the entropy source based on the pulse signal, wherein the stochastic feedback signal is to control a drive strength of a pair of contentious components of the entropy source, and wherein a step size of a change in the drive strength of the pair of contentious components is based on the pulse width of the pulse signal.

19. A circuit, comprising:
an entropy source to generate an output signal, the entropy source including a pair of contentious components with respective drive strengths that are adjustable responsive to respective first and second adjustment signals; and
a stochastic feedback loop to provide the adjustment signal to the entropy source based on the output signal of the entropy source, the stochastic feedback loop including:
a one shot circuit to generate a first pulse signal and a second pulse signal based on the output signal, wherein the one shot circuit is to provide the first pulse signal with a pulse if the output signal has a first logic value and is to provide the second pulse signal with a pulse if the output signal has a second logic value; and
a stepper circuit coupled to the one shot circuit, the stepper circuit including:
a first capacitor node to provide the first adjustment signal for the entropy source;
a second capacitor node to provide the second adjustment signal for the entropy source;
a common pull-up node;
a first pull-up transistor to selectively couple the first capacitor node to the common pull-up node responsive to the pulse in the first pulse signal; and
a second pull-up transistor to selectively couple the second capacitor node to the common pull-up node responsive to the pulse in the second pulse signal.

20. The circuit of claim 19, wherein the stepper circuit further includes:
a tuning resistor coupled between the common pull-up node and a power supply rail.

21. The circuit of claim 20, wherein the tuning resistor is a first tuning resistor, and wherein the stepper circuit further includes:
a common pull-down node;
a second tuning resistor coupled between the common pull-down node and a ground potential;
a first pull-down transistor to selectively couple the second capacitor node to the common pull-down node responsive to the pulse in the first pulse signal; and
a second pull-down transistor to selectively couple the first capacitor node to the common pull-down node responsive to the pulse in the second pulse signal.

22. A random number generator circuit comprising:
an entropy source to generate an output signal; and
a serial decorrelator circuit coupled to the entropy source to:
XOR individual bits of the output signal of the entropy source with a respective prior bit of the output signal that is a first number of bits prior to the individual bit to obtain XORed bits;
subsample the XORed bits; and
output the subsampled XORed bits to generate a random number.

23. The circuit of claim 22, wherein the first number is a prime number.

24. The circuit of claim 22, wherein the serial decorrelator circuit includes:
an XOR gate to perform the XOR of the individual bits to obtain the XORed bits;
a first set of registers to store the first number of the XORed bits;
a second set of registers to subsample the XORed bits; and
a clock division circuit to divide a clock signal used by the first set of registers and provide the divided clock signal to the second set of registers.

25. The circuit of claim 24, wherein the clock signal is generated by a deterministic feedback loop coupled with the entropy source.

* * * * *